US009830628B1

(12) United States Patent
Sayre, III (10) Patent No.: US 9,830,628 B1
(45) Date of Patent: Nov. 28, 2017

(54) CUSTOM AUDIO MESSAGES FOR PACKAGED GOODS

(71) Applicant: Amazon Technologies, Inc., Seattle, WA (US)

(72) Inventor: Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/817,016

(22) Filed: Aug. 3, 2015

(51) Int. Cl.
```
G06Q 30/00    (2012.01)
G06F 17/30    (2006.01)
G06Q 30/06    (2012.01)
G06Q 10/08    (2012.01)
G06F 3/16     (2006.01)
G11B 20/00    (2006.01)
G11B 19/16    (2006.01)
G11B 20/10    (2006.01)
```
(52) U.S. Cl.
CPC ......... *G06Q 30/0621* (2013.01); *G06F 3/167* (2013.01); *G06Q 10/0832* (2013.01); *G06Q 30/0641* (2013.01); *G11B 19/16* (2013.01); *G11B 20/00* (2013.01); *G11B 20/10527* (2013.01); *G11B 2020/10546* (2013.01)

(58) Field of Classification Search
CPC ................................................. G06Q 30/0621
USPC ............................ 704/201; 700/215; 705/26
See application file for complete search history.

(56) References Cited

U.S. PATENT DOCUMENTS

| | | | | |
|---|---|---|---|---|
| 5,444,767 | A * | 8/1995 | Goetcheus | H04M 1/642 206/232 |
| 8,201,737 | B1 * | 6/2012 | Palacios Durazo | G06Q 10/087 235/383 |
| 9,031,869 | B2 * | 5/2015 | Glass | G06Q 30/0621 705/26.5 |
| 2004/0068744 | A1 * | 4/2004 | Claussen | H04N 5/4401 725/81 |
| 2009/0281794 | A1 * | 11/2009 | Ben-Haroush | G06Q 30/0603 704/201 |

(Continued)

OTHER PUBLICATIONS

White-Sax, Barbara, "Retailers Lure Shoppers to Greeting Cards with Signage," Lebhar-Friedman, Inc, 32.15 (2010): p. (1).*

*Primary Examiner* — Michael Misiaszek
*Assistant Examiner* — Latasha Ramphal
(74) *Attorney, Agent, or Firm* — Knobbe, Martens, Olson & Bear, LLP (57) ABSTRACT

Systems and methods are described to enable the inclusion of customized audio messages into packages for physical items. Specifically, embodiments of the present disclosure enable a user, in connection with an order to physical items, to record an audio message (e.g., a gift message) to be played back on the opening of a package including the physical items. The recorded audio message can be encoded into audio data at a user computing device and transmitted over a network to a fulfillment processing system associated with the order. The fulfillment processing system can encode the audio data into a playback device included within a package of the ordered items. The playback device may include one or more sensors (such as mechanical switches, light sensors, etc.) that notify the playback device when the package is opened. The playback device can then output the audio message to a receiving party.

24 Claims, 5 Drawing Sheets

(56) References Cited

U.S. PATENT DOCUMENTS

| | | | | |
|---|---|---|---|---|
| 2012/0011751 A1* | 1/2012 | Schimke | ............. | B42D 15/022 |
| | | | | 40/124.03 |
| 2012/0206650 A1* | 8/2012 | Lin | ............. | H04N 5/60 |
| | | | | 348/515 |
| 2012/0220223 A1* | 8/2012 | Rose | ............. | H04M 1/7253 |
| | | | | 455/41.1 |
| 2012/0242455 A1* | 9/2012 | Hale | ............. | G08C 17/02 |
| | | | | 340/10.1 |
| 2014/0343713 A1* | 11/2014 | Ziegler | ............. | B65G 1/137 |
| | | | | 700/214 |
| 2015/0255111 A1* | 9/2015 | Grasso | ............. | G06F 21/10 |
| | | | | 700/94 |

\* cited by examiner

CUSTOM AUDIO MESSAGES FOR PACKAGED GOODS

BACKGROUND

Distributors or sellers of physical goods in some instances allow customers to include customized messages, such as gift messages, to be packaged with those goods. These messages are often printed on a packing slip, gift card, or other medium and placed within a package for delivery to a recipient. For example, a purchaser may request that the message "Congratulations!" be printed on a card and attached to a package prior to shipping. The purchaser may specify the message electronically (e.g., via submission of a form while purchasing a product) or orally (e.g., via telephone communication with a distributor or seller). The message is then printed for inclusion in the product's packaging. Because most packaged goods include other documentation within the package, such as receipts, delivery of printed messages is relatively easy and cost effective.

More recently, greeting cards have been created that enable audio messages to be recorded and played back to a recipient. These cards generally include a microphone and a speaker, and enable a purchaser to record audio data. For example, a user may purchase a card at a traditional brick-and-mortar store, record a message, and present the card to a recipient. The cards also include a switch or other triggering mechanism, such that the recipient can playback the audio data recorded by the purchaser. Because the audio data is recorded onto the cards locally, purchasers are generally required to physically interact with the card before presentation to a recipient.

In some instances, products may also include messages pre-recorded by a manufacturer. For example, a manufacturer may include a speaker within product packaging that plays a pre-recorded audio when the packaging is moved or opened. These recordings are generally fixed by the manufacturer, and therefore not customizable by a user.

DETAILED DESCRIPTION

Generally described, aspects of the present disclosure relate to enabling customized audio messages to be placed into packaged goods. Specifically, the present disclosure enables a fulfillment entity (e.g., a seller, distributor, shipping provider, etc.) to receive electronic audio data that has been remotely recorded by a purchaser via a computing device, and to encode the audio data onto a playback device to be packaged with physical item for shipment to a recipient. For example, the present disclosure enables a user of an online electronic commerce system to record a gift message to be played back to a recipient of an item, such that the recipient is able to hear the voice of the user when receiving the item. In some instances, a playback device may be configured to detect the opening of a package in which the device is embedded, and in response to such opening, automatically initiate playback of the previously recorded audio message. In this manner, users are enabled to provide customized audio messages for inclusion in packaged goods, without requiring the user to ever physically interact with the goods. Moreover, the present disclosure enables the inclusion of customized audio messages within packaged goods in a partially or wholly automated manner, such that the processes and devices disclosed herein may be utilized in large scale fulfilment centers that process thousands of packages per hour.

In one embodiment, customized audio messages may be submitted by users of an electronic commerce system in connection with purchase or acquisition of an item from the system. Illustratively, a user may utilize a computing device (e.g., a desktop computer, laptop, mobile phone, etc.) to purchase an item, and during the order process, be prompted by the electronic commerce system to record an audio message to a recipient of the item. The user may provide audio data to the computing device (e.g., via a microphone), which can then be encoded by the user's computing device and transmitted to the electronic commerce system. Thereafter, the electronic commerce system can associate the order with the audio data. During processing of the order at a fulfillment entity, the audio data can be encoded within an electronic playback device, which is then embedded or placed in a package with the ordered item.

In one embodiment, a playback device may be encoded with the ordering user's audio data prior to placement in a package. For example, a fulfillment location may include a computing device including a data store of audio data provided by users and in communication with a number of playback devices (e.g., via a wired or wireless connection). When an order that has been associated with custom audio data is processed at the fulfillment location, the computing device can transmit corresponding audio data to one of the playback devices. The specific playback device can then be retrieved and placed into a package with the ordered items. In some instances, the computing device of the fulfillment center may be configured to record an identifier of the playback device on which audio data for a specific order is encoded, such as a serial number. The computing device may further include that identifier on a print-out slip for use by a human operator, who can retrieve the playback device and place it in a package with the ordered items. In other instances, an automated mechanism may be used to place the correct playback device into a package with the ordered items.

In another embodiment, playback devices may be encoded with an ordering user's audio data after inclusion within a package. Encoding of playback devices after packaging may beneficially reduce the complexity of the packaging process itself. For example, a fulfillment center may provide a number of non-programmed playback devices for inclusion in packages, any one of which may later be encoded with audio data of an ordering user. Thus, a packager (either human or automated) would not be required to include a specific, pre-encoded playback device in a given package. In some embodiments, a packager may record an identifier of the playback device placed within the package to enable later encoding of the playback device. In other embodiments, playback devices may be encoded based on an existing identifier of the package (e.g., an order identifier), as described in more detail below. To enable encoding of audio data after packaging of an ordered item, each playback device can include a wireless communication radio component (e.g., a BLUETOOTH™ transceiver module). Using this wireless communication radio component, the fulfillment processing system can encode relevant audio data regarding an ordered item onto the playback device during later processing stages. For example, many fulfillment centers utilize a weight-check device (e.g., a scale) integrated into a conveyance system of the fulfillment center, which automatically checks the weight of a package (e.g., on the conveyance system) against an expected weight, as determined based on items expected in the package. Such weight-check devices generally identify the specific package in question via a barcode or other machine-readable identifier placed on the outside of a package. A fulfillment processing system, such as that described herein, can utilize the known package identifier, as previously associated with a specific order, to determine what audio data if any, is to be encoded within a playback device included in the package. The fulfillment processing system can then wirelessly communicate with the playback device included in the package to encode relevant audio data for the package.

In one embodiment, the fulfillment processing system may wirelessly communicate with the playback device based on a previously recorded identifier of the playback device (e.g., as recorded when placing the playback device within the package). For example, the fulfillment center may broadcast a request to establish wireless communication with a playback device having the previously recorded identifier, and after establishing communication, transmit relevant audio data to the playback device.

In another embodiment, the fulfillment processing system may communicate with a playback device included within a package based on an identifier of the package, without requiring knowledge of the playback device's identifier. For example, on identifying a package within a threshold distance from a wireless transceiver of the fulfillment processing system (e.g., via a barcode scanner or other automated package identification system), the fulfillment processing system may transmit audio data relevant to the package to any nearby playback device, causing the playback device within the package to be encoded with audio data for the package. In these embodiments, the fulfillment center may be arranged such that when a package or set of packages for a specific order are within a threshold distance from a wireless transceiver of the fulfillment processing system, no other packages (e.g., not associated with the order) are within that threshold of the wireless transceiver, as this arrangement may prevent audio data from being encoded onto playback devices in those other packages.

The playback device may include any combination of hardware components required to receive and playback audio data related to a package. In one embodiment, the playback device includes a battery-powered microcontroller, which are available in sizes suitable for inclusion in most shipped packages. As will be described below, the playback device may include data store and communication interfaces enabling the encoding of audio data, as well as a speaker or other audio output device to playback that audio data. The playback device may also include one or more switches or sensors enabling audio data to be played back at an appropriate time.

In some embodiments, the playback device may be configured to detect the opening of a package in which the device is placed, and to automatically being playback of encoded audio data. For example, a playback device may include a light sensor that is configured to cause playback of encoded audio data on exposure to a threshold amount of light. As a further example, a playback device may include a sliding switch, which is placed in a package such that opening the package (e.g., by opening a box or bag) causes the switch to trigger, beginning playback of encoded audio. In some instances, playback devices may include a combination of switches or sensors, and be configured to begin playback of audio data when a combination of events occurs (e.g., toggling of a switch and detection of a threshold amount of light).

Playback devices may further be configured to ensure the privacy of audio data encoded thereon. For example, wireless transmission of audio data to a playback device after packaging (as described above) may help to ensure that a playback device does not playback the audio data until after the package has been opened. As another example, a playback device may be configured to prevent playback of audio data until at least a threshold amount of time after encoding. In some instances, the threshold amount of time may be selected based on an expected delivery time of the package (e.g., a playback device embedded in a package with two day shipping may be configured to prevent playback until at least two days after encoding). In other instances, the threshold amount of time may be predetermined (e.g., to ensure sufficient time for the package to leave a fulfillment location).

While examples are provided herein that playback devices as separate from physical items within an order, some embodiments of the present application may utilize playback devices that are integrated or physically combined within one or more packaged goods. For example, an electronic commerce site may enable users to purchase greeting cards or gift cards with integrated playback devices, and further enable the users to transmit, via network, a recorded message to be encoded on those integrated playback devices. A fulfillment center of the electronic commerce site may then encode the audio data of the recorded message onto the integrated playback devices, and ship the greeting card or gift card to a receiving user. Thus, users of the electronic commerce site can be enabled to acquire and send physical goods including customized audio messages, without being required to physically interact with those physical goods.

The foregoing aspects and many of the attendant advantages of the present disclosure will become more readily appreciated as the same become better understood by reference to the following, when taken in conjunction with the accompanying drawings.

Figure 1:
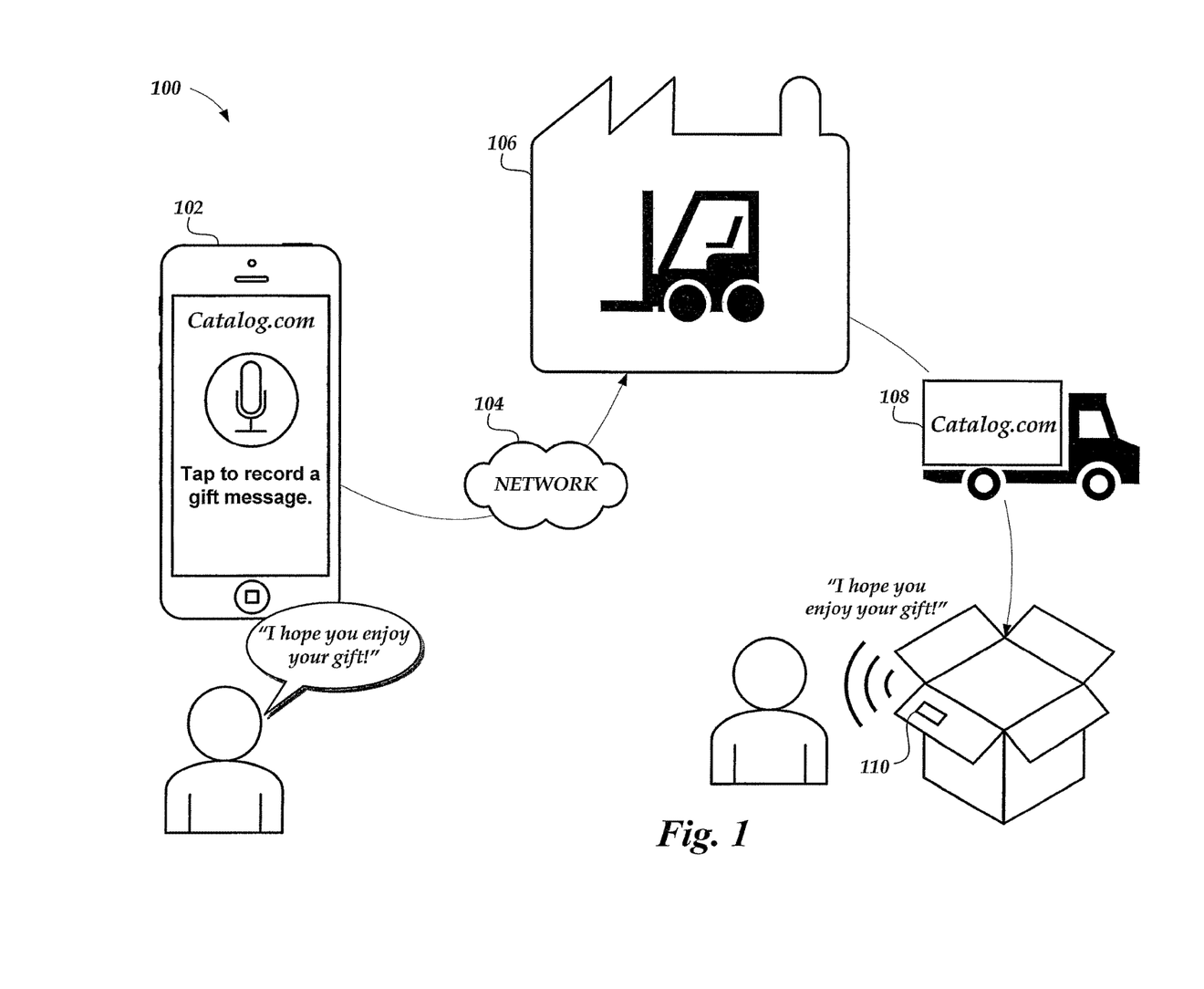
FIG. 1 is a block diagram depicting an illustrative operating environment 100 in which a fulfillment facility may receive an electronically submitted audio message for inclusion in a packaged good, embed a playback device including the audio message within the packaged good, and ship the packaged good, including the playback device, to a recipient.

FIG. 1 is a block diagram depicting an illustrative operating environment 100 for encoding customized audio data onto a playback device 110, and including the playback device 110 into a package with a corresponding item such that the audio data is played back to a recipient of the package. As shown in FIG. 1, the operating environment 100 includes a user computing device 102 in communication with a fulfillment processing system 106 via a network 104.

In FIG. 1, the user computing device 102 is illustratively depicted as a mobile phone (e.g., a "smart phone"). In other embodiments, the user computing device 102 may correspond to any number of different computing devices capable of receiving user-specific audio data and communicating that audio data to the fulfillment processing system 106. For example, individual accessing computing devices may correspond to a laptop or tablet computer, personal computer, wearable computer, voice command device, server, personal digital assistant (PDA), hybrid PDA/mobile phone, mobile phone, electronic book reader, set-top box, camera, digital media player, and the like. A user computing device 102 can include a microphone or other input device capable of receiving audio data, or may be in communication with an external component capable of transmitting audio data to the user computing device 102 (e.g., an external microphone, audio recorder, personal audio player, an additional computing device, etc.).

Network 104 may be any wired network, wireless network or combination thereof. In addition, the network 104 may be a personal area network, local area network, wide area network, cable network, satellite network, cellular telephone network, or combination thereof. In the example environment of FIG. 1, network 104 is a global area network (GAN), such as the Internet. Protocols and components for communicating via the other aforementioned types of communication networks are known to those skilled in the art of computer communications and thus, need not be described in more detail herein.

The fulfillment processing system 106 may be associated with a fulfillment center, which operates to process orders of physical items (e.g., submitted via an electronic commerce site), retrieve those physical items ordered, and package the items for delivery to a receiving user. The general operation of fulfillment centers to process and package items is known in the art, and therefore will not be described in detail herein. The fulfillment processing system 106 may integrate in to existing operations of the fulfillment center to enable the seamless, high-efficiency inclusion of audio playback device 110 into packages. Specifically, as described in more detail below, the fulfillment processing system 106 may include a data store of audio data provided by user computing devices 102 in association with orders for physical items. This data store may further include additional information regarding an order or audio data to be encoded on a playback device for the order. For example, the data store may include information indicating an association between one or more of an order, the items included within that order, the user who placed the order, the audio data provided by the user who placed the order, the intended recipient of the order. The data store may further indicate an identifier of one or more packages for the order (e.g., including items of the order) or a playback device to be encoded with audio data for the order (e.g., as recorded during pre-encoding of the playback device or placement of the playback device within a package for the order).

During fulfillment of each order, the fulfillment processing system 106 may determine a set of audio data associated with the order, and encode the audio data onto a playback device 110 included within a package containing the ordered items. In one embodiment, the fulfillment processing system 106 may operate on a "just-in-time" basis, by encoding audio data onto a playback device 110 just prior to creation of a package for an order, and notifying a packager to include the playback device 110 into the package. In another embodiment, the fulfilment processing system 106 may automatically encode relevant audio data for an order after a package for the order has been created, by wirelessly communicating with a playback device 110 previously placed into the package. As noted below, post-packaging encoding of playback device 110 may enable integration with existing error-checking mechanisms in place at a fulfilment center (e.g., weight-checking of package), thereby increasing the efficiency of operation of the fulfillment processing system 106.

The operating environment 100 further includes a delivery system 108, which operates to deliver the package (including a playback device 110 encoded with custom audio data) to a receiving user. The delivery system 108 may include any number or combination of human-operated or automated transportation systems (e.g., public mail systems, delivery services, courier services, etc.). In one embodiment, the delivery system 108 may utilize partially or wholly automated unmanned aerial vehicles to deliver package to receiving users. Various additional delivery systems 108 are known in the art, and therefore will not be discussed herein.

The playback device 110 can include a combination of hardware and software (executed by hardware) configured to receive audio data provided by a user computing device 102 and playback that audio data to a receiving user. For example, the playback device 110 may include a microprocessor and communication interface enabling communication with the fulfillment processing system 106 and reception of audio data. The playback device 110 may further include an output device, such as a speaker, to playback the audio data to a receiving user. In some embodiments, the playback device 110 may include one or more sensors or switches enabling the playback device 110 to automatically detect the opening of a package in which the playback device 110 is placed, an in response, to playback the audio data included on the playback device 110. Further description regarding the configuration and operation of playback devices 110 is provided below with respect to FIG. 4.

Figure 2:
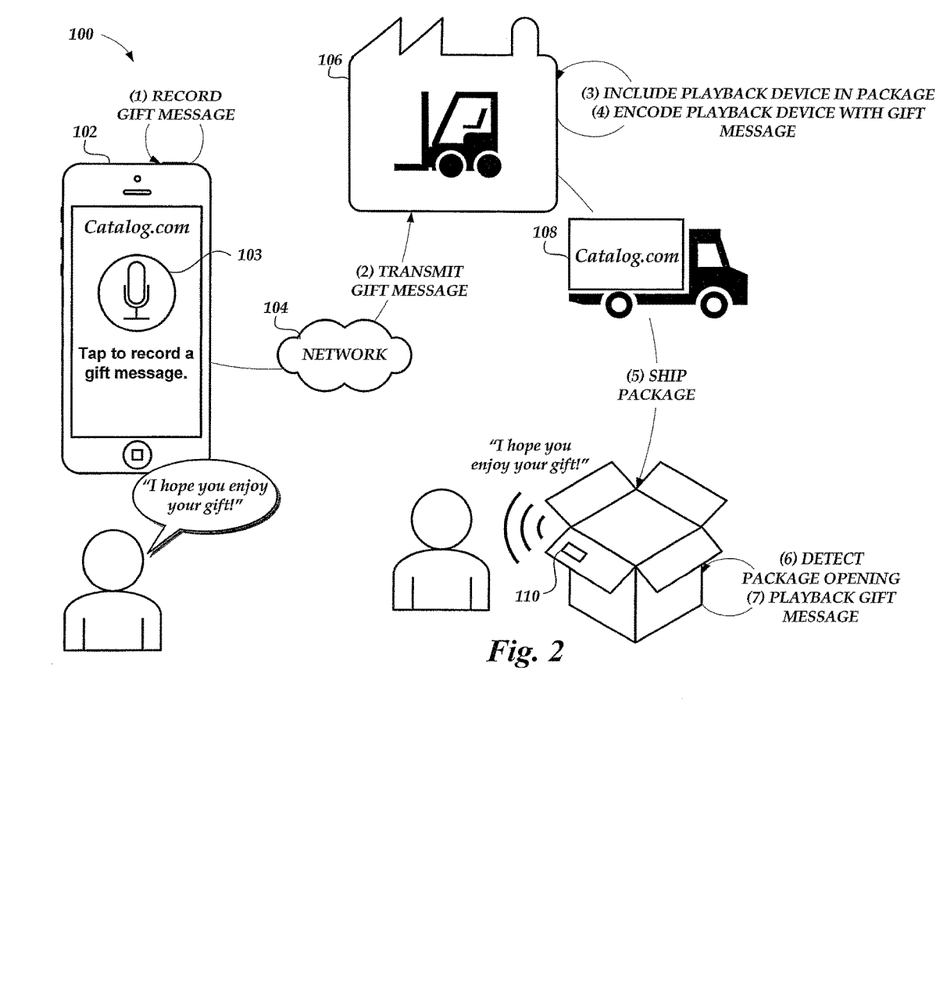
FIG. 2 is a block diagram depicting illustrative interactions for electronically submitting an audio message to a fulfillment facility of FIG. 1, embedding a playback device including the audio message within a packaged good, and shipping the packaged good to a recipient.

With reference to FIG. 2, an illustrative set of interactions will be described for utilizing the operating environment 100 to encode customized audio data onto a playback device 110 and include the playback device 110 into a package with a corresponding item such that the audio data is played back to a recipient of the package. Specifically, the interactions of FIG. 2 begin at (1), where a user utilizes a user computing device 102 to record a gift message for inclusion with a package. Illustratively, the gift message is recorded in connection with an order placed by a user of the user computing device 102 for one or more physical items available from or through an electronic commerce site (identified in FIG. 2 as "Catalog.com"). In some instances, the order may be placed via the user computing device 102 itself (e.g., via a mobile application or other software executing on the user computing device 102), and the gift message may be recorded prior to, during, or after placement of the order. In other instances, the order may be initially placed via an alternate communication channel to the electronic catalog system (e.g., via traditional telephone communication or an alternative computing device not shown in FIG. 2), and the user may later utilize the user computing device 102 to add an audio gift message to the order. Illustratively, a user may activate a user interface element, such as button 103, on the user computing device 102 to begin recording via an audio input of the user computing device 102 (such as a microphone). Thereafter, the user may speak (or otherwise convey) an audio message to be included within a package containing the ordered items, and automatically played back to a recipient on opening the package. The user computing device 102 may then halt recording, and generate audio data corresponding to the recorded audio. The audio data may include any digital representation of the recorded audio. Various formats for digitally representing recorded audio data are known within the industry and include, but are not limited to, the Waveform Audio File Format (WAV), Windows Media Audio (WMA) formats, Advanced Audio Coding (AAC) formats, MPEG Audio Layer III (MP3) formats and pulse-code modulation (PCM) formats. In some embodiments, the user computing device may also enable a user to provide a pre-recorded audio file (e.g., recorded on an alternative computing device).

Thereafter, at (2), the recorded gift message is transmitted via the network 104 to a fulfillment processing system 106 of the electronic catalog system. For the purposes of FIG. 2, the fulfillment processing system 106 is shown as associated with an individual fulfillment center. However, the fulfillment processing system 106 may in some instances be associated with multiple fulfillment centers. Accordingly, transmission of the recorded gift message may include transmitting the recorded gift message to a fulfillment processing system 106 associated with a specific fulfillment center selected to package and ship the items associated with an order. Various mechanisms for selecting a specific fulfillment center to package and ship specific an order are known within the art, and therefore will not be discussed herein. In some instances, data corresponding to the recorded gift message may be encrypted (e.g., at the user computing device 102 or at computing devices associated with the electronic commerce site not shown in FIG. 2) during transmission over the network 104 to prevent unauthorized access to the recorded data. Encryption of network-transmitted data is also known within the art.

At (3), the fulfillment processing system 106 causes a playback device 110 to be included with a package including the ordered items. In one embodiment, the fulfillment processing system 106 may cause a playback device 110 via transmission of instructions to human operator. For example, where ordered items are placed within a package by a human operator, the fulfillment processing system 106 may add a playback device 110 to an electronic listing of the ordered items. The fulfillment processing system 106 may then print the listing of the ordered items, including the playback device 110, to request that the human operator place each item on the listing, including the playback device 110, into a package. In other embodiments, the fulfillment processing system 106 may cause the playback device 110 to be automatically or semi-automatically included with a package. Illustratively, where a fulfilment center utilizes an automated storage and retrieval system, or "ASRS," (a variety of examples of which are known in the art), the fulfillment processing system 106 may add a playback device 110 to the listing of items that the ASRS is to retrieve. In some instances, playback devices 110 may be integrated into packaging material, such that the playback device 110 is already included within a package that can then be filled with relevant ordered items by a human operator or ASRS of the fulfillment center. In some embodiments, the fulfillment processing system 106 may gather data regarding the specific playback device 110 placed within the package. For example, an interacting party—either automated, semi-automated, or manual—may be required to collect an identifier of the specific playback device 110 placed with the package, which the fulfillment processing system 106 may then associate with the order being processed. Collection of an identifier may occur, for example, via scanning a machine readable code (e.g., a barcode) of the playback device 110, via manually entering a human-readable identifier of the playback device 110, or by close-proximity transmission of the playback device 110 (e.g., radio frequency identification [RFID] transmissions, near field communication [NFC] transmissions, etc.).

In some embodiments, the playback device 110 may be simply placed within a package. In other embodiments, the playback device 110 may be placed in a specific location of the package. For example, where the playback device 110 includes a light sensor to detect the opening of a package, the playback device 110 may be placed on top of other goods within the package to ensure that the device senses light when the package is opened. As a further example, where a playback device 110 includes a mechanical switch used in detecting when a package is open, a packager or packaging system may attach that mechanical switch to a moving portion of the package (e.g., a lid or a drawstring) such that opening the package activates the mechanical switch. In some instances, the fulfillment processing system 106 may cause playback devices to be pre-installed into packages for goods. For example, a playback device 110 may be inserted into a package during manufacturing of that package, such that installation of the playback device at the fulfillment center would be unnecessary. In these instances, the fulfillment processing system 106 would simply cause a packager or packaging system to place the items associated with an order into a package already containing a playback device 110.

At (4), the fulfillment processing system 106 can encode the playback device with the received gift message. In one embodiment, encoding may occur during an existing post-packaging process utilized by the fulfillment center. Illustratively, the fulfillment center may utilize an automated weight verification system for completed packages. The weight verification system may utilize a conveyer system to move each completed package over a scale, to scan or otherwise identify the completed package (e.g., based on machine readable codes placed on the package), and to verify the weight of the completed package based on the items intended to be within the completed package. In such instances, the fulfillment processing system 106 may utilize the known identity of each package (as used to verify the weight of each package) to encode the gift message onto the appropriate package. Specifically, the fulfillment processing system 106 may be configured to detect that a package associated with the recorded gift message has entered a specific portion of the conveyance system (e.g., via scanning a barcode of the package), and to convey the recorded gift message to the playback device 110 included within the package. The fulfillment processing system 106 may then convey the recorded gift message wirelessly to a playback device 110 included within the package. Various protocols for wirelessly transmitting data are known within the art, and include but are not limited to BLUETOOTH, the 802.11x family of wireless protocols, wireless USB, and NFC protocols. In some instances, the fulfillment processing system 106 may verify that the gift message is transmitted to the correct playback device 110 by verifying an identifier of the playback device 110 (as previously collected by the fulfillment processing system 106) prior to or during transmission of the gift message. For example, the fulfillment processing device 110 may broadcast a request to initiate wireless communication with a playback device 110 associated with the known identifier, and thereafter establish communication with that playback device 110. In other instances, use an identifier for the playback device 110 may be unnecessary. For example, the fulfillment processing system 106 may not be required to utilize an identifier for a playback device 110 where only a single package including a playback device 110 is within a given wireless communication range of the fulfillment processing system 106.

While encoding is described above as integrated into an existing post-packaging process, encoding may also be implemented independently by the fulfillment processing system 106. For example, each package completed by a fulfillment center may be moved (e.g., by a human operator, ASRS, or conveyance system) past a message encoding system within the fulfillment processing system 106. The message encoding system may include a barcode reader, scanner, or other sensor to identify the order associated with the package, as well as a wireless communication device. On detecting a package for an order associated with a gift message, the message encoding system may transmit an appropriate gift message to a playback device 110 within the package, thus enabling the gift message to be played back by a receiver of the package.

Further, while examples above describe the transmission of a gift message to a playback device 110 subsequent to packaging, some embodiments of the present disclosure include transmission of a gift message to a playback device 110 prior to packaging. Illustratively, the fulfillment processing system 106 may, on receiving a gift message for an order, encode a specific playback device 110 with that gift message. Such encoding may occur wirelessly, as described above, or via a wired connection with the specific playback device 110. The fulfillment processing system 106 may then include an identifier of that specific playback device 110 within a list of items to be placed within a package for the order. In some instances, post-packaging transmission of gift messages may be preferred to pre-packaging transmission, since post-packaging transmission would not require the location of a specific, pre-programmed playback device 110 for inclusion within a package but would enable any not-yet-programmed playback device 110 to be included.

At (5), the package including the playback device 110 is shipped via the delivery system 108 to a receiving user. Thereafter, the receiving user may open the package to listen to the audio gift message encoded onto the playback device 110. Specifically, at (6), the playback device 110 can detect that the package has been opened. Illustratively, the playback device 110 utilizes light sensors to determine that the package has been opened, exposing the playback device 110. Additionally or alternatively, the playback device 110 can utilize mechanism switches or sensors that are triggered when opening the package, or moving portions of the package relative to one another. For example, as noted above, a playback device 110 may be installed on or into a package such that opening the package activates a mechanical switch. Activation of the switch (either alone or in conjunction with feedback from additional sensors, such as light sensors) can therefore indicate that the package has been opened. Thus, at (7), the playback device 110 can initiate playback of the recorded gift message via a speaker or other output device included within the playback device 110, enabling the receiving user to listen to the gift message electronically recorded with the order.

Figure 3:
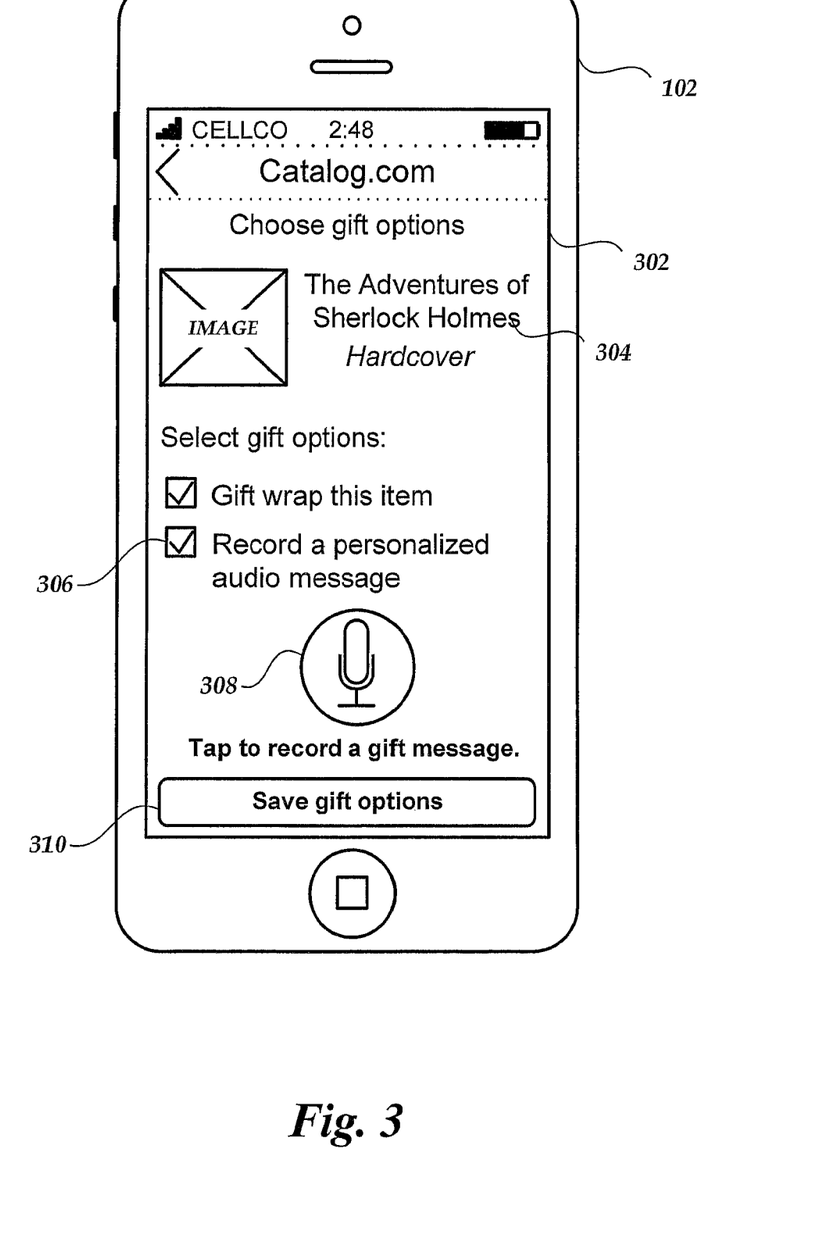
FIG. 3 is an illustrative depiction of a user interface displayed on a user computing device of FIG. 1 to enable the electronic submission of an audio message in connection with an order for a packaged good.

With reference to FIG. 3, an illustrative user interface 302 that may be displayed on a user computing device 102 to facilitate recording and transmitting audio data to the fulfillment processing system 106 of FIG. 1 will be described. As described above, the user computing device 102 may include any variety of computing devices, such as desktop computers, laptop computers, tablets, mobile phones, and the like. In FIG. 3, the user computing device 102 corresponds to a mobile phone capable of executing software applications ("mobile applications"). In one embodiment, the user interface 302 is displayed on the user computing device 102 by a network browser application (e.g., a web browser) configured to interpret hypertext markup language ("HTML") documents transmitted to the user computing device 102 by an electronic catalog system associated with the fulfillment processing system 106 of FIG. 1. Thus, instructions for generating all or a portion of the user interface 302 may be created remotely from the user computing device 102 at the electronic commerce system and then transmitted to the user computing device (e.g., as encoded in an HTML document), to enable the user computing device 102 to generate the user interface 302 for presentation to a user. In another embodiment, the user interface 302 is displayed on the user computing device 102 by a specialized application (e.g., a "mobile app") configured to enable interaction with the electronic commerce system. Similarly to the network browser application described above, a specialized application may communicate with a remote electronic commerce system to receive instructions for generating all or a portion of the user interface 302. The specialized application can then cause the user computing device 102 to generate the user interface 302 of FIG. 3.

As shown in FIG. 3, the user interface 302 enables a user of the user computing device 102 to select gift options for an order previously or currently being placed on an electronic catalog system (identified in FIG. 3 as "Catalog.com"). The specific order shown in FIG. 3 is for a printed, hardback copy of the book "*The Adventures of Sherlock Holmes*," as reflected in the item identifier 304. The user interface 302 provides a variety of gift options for the item. Specifically, the user interface 302 includes a user input 306 enabling a user to request that a personalized audio message be recorded and included within a package with the ordered item. When the user input 306 is selected, the user interface 304 displays an additional user input 308, which enables the user to record the audio message to be included within the package. Thus, selection of the input 308 can cause the user computing device 102 to begin recording (e.g., through a microphone of the user computing device 102 not shown in FIG. 3). Illustratively, the user may select input 308 again to halt recording of the audio message, or the user computing device 102 may automatically halt recording after a predetermined period of silence. In some embodiments, the user computing device 102 may automatically encode the recorded audio into audio data, and transmit the audio data via a network 104 to the fulfillment processing system 106. In other embodiments, the user computing device 102 may store the recorded audio data in memory until the user selects input 310, which may cause the various options selected by the user as well as the audio data to be transmitted via the network 104 to the fulfillment processing system 106. As described below, the audio data may thereafter be encoded onto a playback device that is packaged with the ordered items and configured to playback the audio data when the package is opened by a receiving user.

Figure 4:
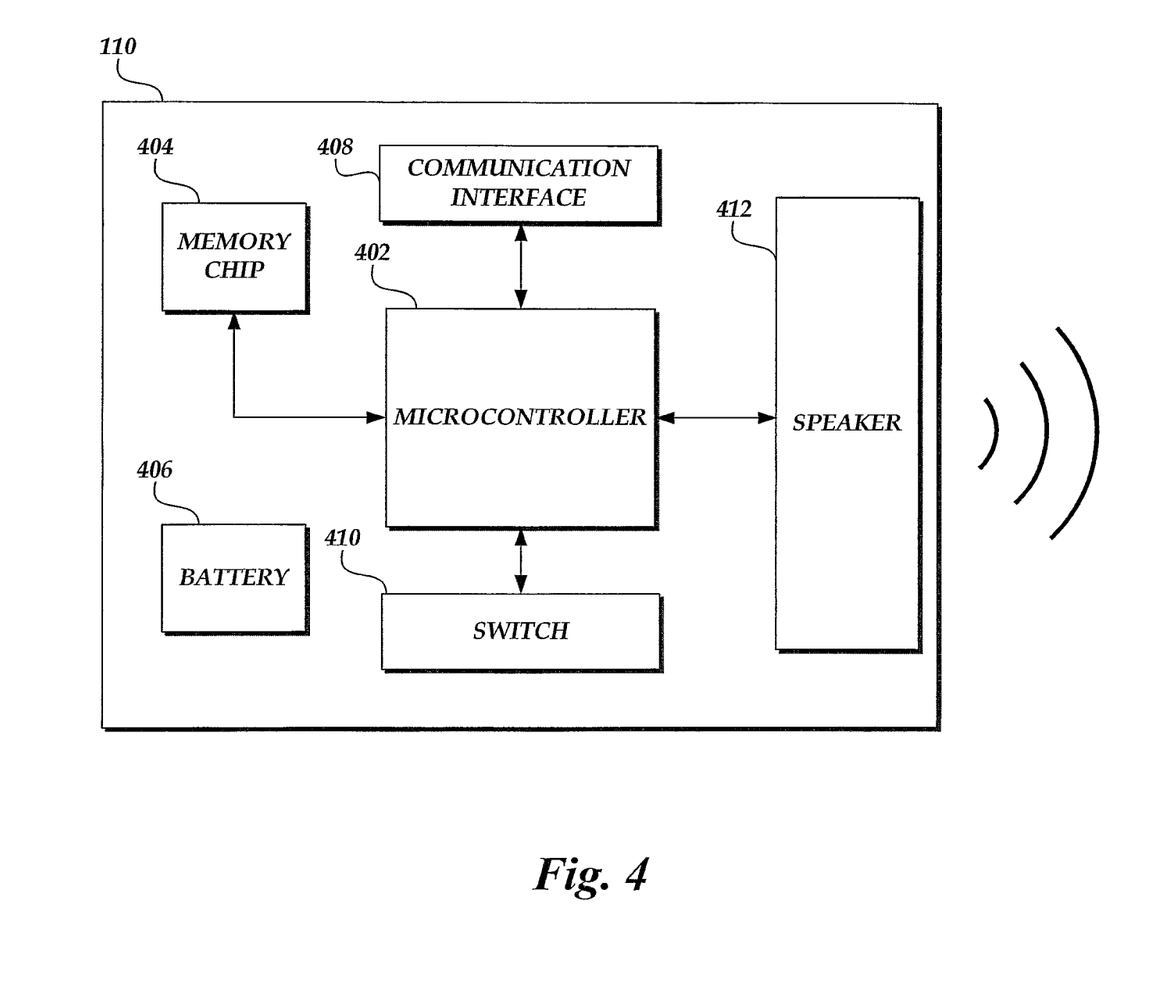
FIG. 4 is a block diagram depicting a playback device to be embedded within a packaged good, and including components for receiving an electronically submitted audio message and playing back the audio message to a recipient.

With reference to FIG. 4, a block diagram is shown of an illustrative playback device 110 that may be used in connection with the embodiments herein. As shown in FIG. 4, the playback device 110 may include a microcontroller 402 in communication with a memory chip 404, a communication interface 408, a switch 410, and a speaker 412. Each of the microcontroller 402, memory chip 404, communication interface 408, switches 410, and speaker 412 may be interconnected on a printed circuit board (PCB) and powered by a battery 406. The layout of the microcontroller 402, memory chip 404, communication interface 408, switch 410, and speaker 412 shown in FIG. 4 is intended for illustrative purposes, and it is contemplated that the specific position of the microcontroller 402, memory chip 404, communication interface 408, switch 410, and speaker 412 within one or more PCBs may vary according to the desired physical properties of the playback device 110. While a single microcontroller 402, memory chip 404, communication interface 408, switch 410, and speaker 412 are shown for the purposes of illustration, the playback device 110 may include one or more of each of the microcontroller 402, memory chip 404, communication interface 408, switch 410, and speaker 412 collectively configured to implement the functions described herein.

The microcontroller 402 may include any integrated circuit containing a processor core, memory, and input/output interfaces collectively configured to execute the operations described herein. In one embodiment, the microcontroller 402 is a Dialog Semiconductor SMARTBOND™ DA14582 device, a Nuvoton ISD1965 CHIPCORDER™ device, or a Texas Instruments MSP430G2001 mixed signal microcontroller. Illustratively, the microcontroller 402 may be programmed with computer-executable instructions to receive an audio gift message via the communication interface 408 and to store the audio gift message within the memory chip 404. As will be described below, the microcontroller 402 may further include computer-executable instructions configured the playback device 110 to detect an opening of a package via a switch 410, and to initiate playback of the audio message via the speaker 412. Thus, the playback device 110 can be placed into a package to enable a customized audio message to be played when the package is opened.

The memory chip 404 can include any non-volatile computer storage media, such as flash memory (e.g., NAND or NOR type flash). The capacity of the memory chip 404 can be selected according to the maximum size of audio data to be placed within the memory chip 404 by the microcontroller 402. For example, it is expected that 30 seconds of audio data utilizing 11 bit samples at 11 kilosamples per second would result in 3.63 megabits of data. Thus, the memory chip 404 may correspond to a 4 megabit flash memory. In some instances, the microcontroller 402 may include sufficient memory to hold audio data of the desired size. As such, a separate memory chip 404 may be unnecessary and excluded from the playback device 110.

The communication interface 408 can include any wired or wireless interface enabling communication with the fulfillment processing system 106 described above. By way of non-limiting example, the communication interface may be a BLUETOOH™ interface, an NFC interface, an 802.11x protocol interface, a universal serial bus (USB) interface, an RS-232 serial interface, or any combination thereof. In some instances, an interface 408 may be integrated into the microcontroller 402, and thus a separate communication interface 408 may be unnecessary and excluded from the playback device 110. While not shown in FIG. 4, the communication interface 408 may also include physical structures necessary to receive and transmit data via the communication interface 408, such as a wireless antenna, a data port, or electrical contacts.

The switch 410 is communicatively connected to the microcontroller 402, and configured to enable the microcontroller 402 to detect the opening of a package in which the playback device 110 is placed. In the illustrative embodiment of FIG. 4, the switch 310 is a sliding switch that is connected to the physical structure of the package. In one embodiment, the playback device 110 may be attached to one portion of the package, such as a side wall, while the switch 310 is connected to a second portion of the package, such as a lid. Thus, opening the lid of the package may cause the switch 410 to be closed, or activated. In other embodiments, the switch 308 may be attached to other portions of the package that are moved during opening, such as a drawstring. Thus, activation of the drawstring by a user can cause the switch 408 to be activated. While examples are provided herein with respect to a slide switch, additional or alternative switch types may also be used by the playback device 110. For example, the playback device 110 may include rotary or toggle switches attached to portions of the package that are moved during opening, such that opening the package activates the switch. In some instances, the playback device 110 may utilize variable-state inputs, such as potentiometers, rather than discrete state switches. For example, a potentiometer may be attached to a drawstring, such that pulling the string rotates the potentiometer and notifies the playback device 110 that the package has been opened.

While not shown in FIG. 4, the playback device 110 may additionally or alternatively include other sensors to detect opening of the package, such as an optical sensor configured to detect when light enters the package (and thus notify the playback device 110 that the package has been opened). In some such embodiments, switch 410 may be omitted, and replaced with alternative sensor types. Illustratively, various types of sensors (switches, optical sensors, etc.) may be used in combination to ensure that the playback device 110 does not play the message before the package is opened, e.g., while still in the fulfillment center or during transit, and that it accurately determines the opening of a package to begin playback of a recorded audio message. In some embodiments, the playback device 110 may include inputs (such as press-button switches) enabling a receiving user to control operations of the microcontroller 110. For example, the playback device 110 may include a switch enabling a receiving user to toggle manual playback of the gift message after opening a package, or enabling a receiving user to re-record the audio data stored within the memory chip 404 (e.g., by way of a microphone optionally included within the playback device 110, though not shown in FIG. 4).

After detecting the opening of the package (or on manual activation of an input by a receiving user), the playback device 110 can cause the audio data stored within the memory chip 404 (or within the memory of the microcontroller 402 itself) to be played back via the speaker 412. Illustratively, the speaker 412 may correspond to a wafer-type loudspeaker attached to or embedded within the playback device 110, which the microcontroller 402 may operate to recreate the audio data corresponding to a received gift message. In some instances, the microcontroller 402 may be capable of directly controlling the speaker 412 and thus, no additional components would be required on the playback device 110. In other embodiments, additional components, such as amplifiers or digital-to-analog converters ("DACs") (not shown in FIG. 4) may be included between the microcontroller 402 and the speaker 412 to facilitate playback of audio data. Illustratively, where the microcontroller 402 corresponds to a Dialog Semiconductor SMARTBOND™ DA14582 device, the playback device 110 may include a Diodes Inc. PAM8303 amplifier. Similarly, where the microcontroller 402 corresponds to a Texas Instruments MSP430G2001 mixed signal microcontroller, the playback device 110 may include both a Diodes Inc. PAM8303 amplifier and a Microchip MCP47A1 DAC. Other potential microcontrollers 402, such as the Nuvoton ISD1965 CHIP- CORDER™ device, may not require additional components to interface with the speaker 412.

The playback device 110 further includes a battery 406 providing power to the various components described above. Numerous examples of batteries are known within the art, capable of storing sufficient power for a sufficient amount of time to power the device 110, and the specific battery 406 utilized by the playback device 110 may be selected according to the power requirements of the various components described above as well as the size, dimension, and cost constraints of the playback device 110. However, it is contemplated that the combinations of components discussed above may be sufficiently powered by a combination of three CR2032 lithium/manganese dioxide coin cell batteries.

Though not shown in FIG. 4, in some embodiments the playback device 110 may include multiple, distinct batteries configured to separately power different components of the playback device 110. For example, the playback device 110 may include a first battery (or set of batteries) powering the microcontroller 402, communication interface 408, and memory chip 404, and a second battery powering various audio-output components (such as DACs or amplifiers). As such, while using the first battery, the playback device 110 may have sufficient power to receive recorded audio data for storage in the memory chip 404, but not have sufficient power to playback the audio data. In this configuration, both the first and second batteries may be installed within the playback device 110, but the second battery may be physically prevented from powering the playback device 110 by a pull-tab or other physical barrier. Thus, prior to the pull-tab being removed, the playback device 110 may be programmed with audio data at the fulfillment center without risk that the audio data could be played back (ensuring the privacy of the data). The pull-tab may then be removed by a receiving user to enable playback of the audio data. In some instances, the pull-tab may be physically connected to the structure of a package, such that opening the package causes the pull tab to be removed (e.g., by attaching the pull-tab to a lid or drawstring of a package). The microcontroller 402 can be configured to immediately begin playback of the audio data on removal of the pull-tab (and connection with the second battery). Thus, a pull-tab may function as a switch to initiated playback of audio data on opening of a package, and the separate switch 410 can be omitted from the playback device 110.

While the illustrative depiction of a playback device 110 within FIG. 4 includes a microcontroller 402 with integrated processor core, memory, and input/output interfaces, alternative embodiments of the playback device 110 may include one or more distinct processors, processor cores, memories, and input/output interfaces exclusive of or in conjunction with a microcontroller 402. Moreover, one skilled in the art will appreciate that the playback device 110 may include additional components or elements from those shown in FIG. 4 without departing from the scope of the present disclosure. For example, other embodiments of the playback device 110 may include additional or alternative output components than those depicted within FIG. 4. Illustratively, such output components may include a video screen to display visual data, or a haptic feedback device (e.g., vibration output devices) to output vibrational patterns or other tactile information. The playback device 110 may further include dedicated-function or general function processing components (such as a video processor) to enable output of visual or haptic data by the playback device 110. Thus, a user utilizing a user computing device 102 may submit visual or haptic data to the fulfillment processing system 106, which may be encoded onto the playback device 110 and output to a receiving user. In another embodiment, the playback device 110 may include programming or components enabling the device to be re-encoded by a receiving user. For example, the communication interface 408 may enable the playback device 110 to receive updated software or firmware information from a computing device of a receiving party. Thus, the receiving party may be able to repurpose the playback device 110 (e.g., after initial playback of the audio data encoded thereon) to any arbitrary functionality supported by the hardware components of the playback device 110.

Figure 5:
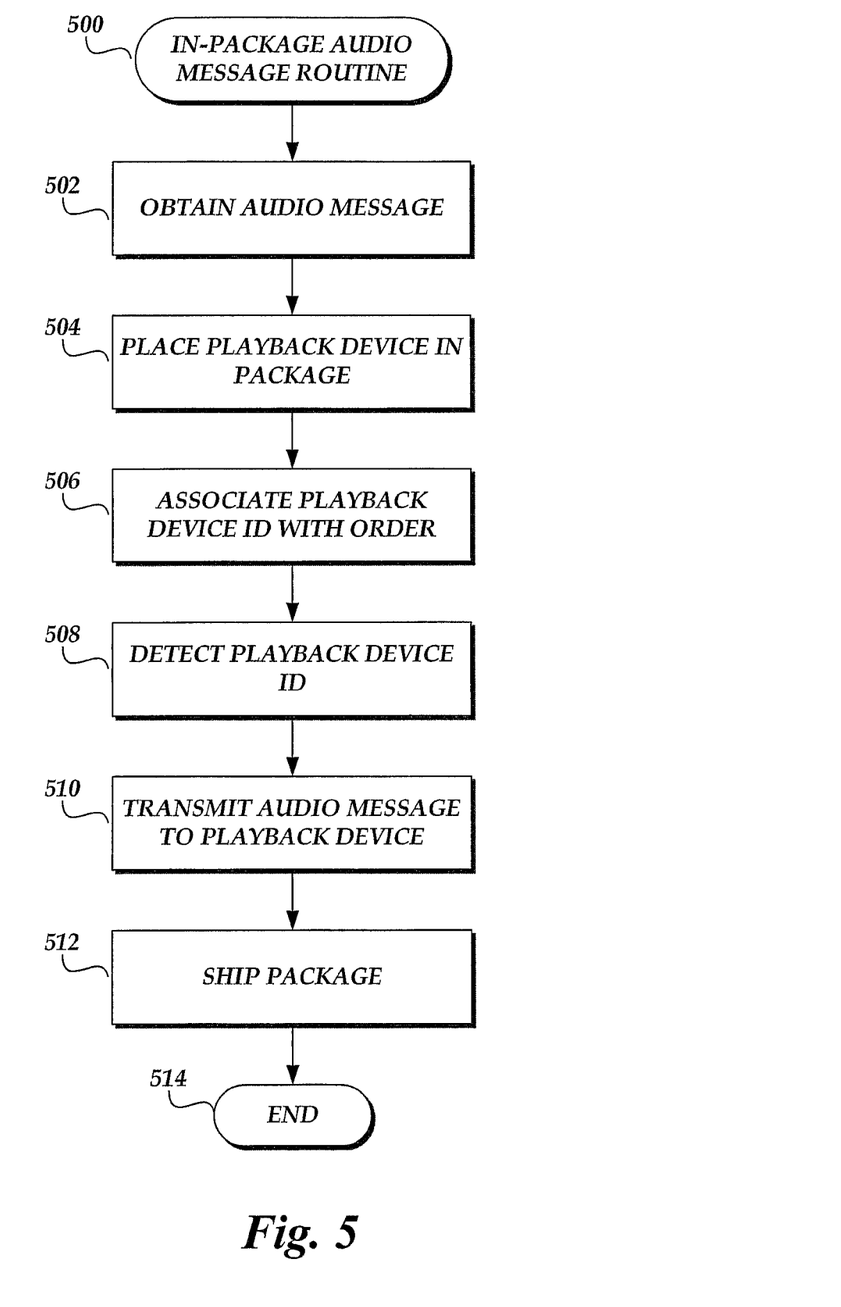
FIG. 5 is a flow chart depicting an illustrative routine for embedding a playback device, including an electronically submitted audio message, within a packaged good.

With reference to FIG. 5, one illustrative routine 500 for creation of delivery of customized audio messages with packaged items is described. The routine may be carried out, for example, by the fulfillment processing system 106 of FIG. 1.

The routine 500 begins at block 502, where the fulfillment processing system 106 obtains an audio message from a user in conjunction with an order for physical items. Illustratively, the user may record the audio message via a user computing device prior to, during, or after placing an order with an electronic catalog system associated with the fulfillment processing system 106. Thereafter, the electronic catalog system may receive audio data corresponding to the recorded audio message, and transmit the audio data to the fulfillment processing system 106, which may be housed within a fulfillment center selected by the electronic catalog system to package and ship the items associated with the order.

Thereafter, at block 504, the fulfillment processing system 106 causes a playback device to be placed within a package, along with the items associated with the order. Illustratively, the fulfillment processing system 106 may cause a packaging slip to be printed for the order, the packaging slip including an indication that a playback device is to be included in the order. Thus, a human packager at the fulfillment center can retrieve a playback device and place the playback device within the package. As a further illustration, the fulfillment processing system 106 may cause an automated or semi-automated packaging system to place the playback device within the package. For example, the fulfillment processing system 106 may instruct an ASRS system to retrieve the playback device along with the items associated with the order, and to place the playback device and items into the package.

In some embodiments, the playback device may be simply placed within a package without special configuration. In other embodiments, the playback device may be placed in a specific location of the package. For example, where the playback device includes a light sensor to detect the opening of a package, the playback device may be placed on top of other goods within the package to ensure that the device senses light when the package is opened. In some instances, a package containing a playback device may be specially constructed to hold the playback device at a predefined location, such as in a slot nearby to the top of the package. As such, the fulfillment processing system 106 may instruct a packager (either human, automated, or combination thereof) to place the playback device at that predefined location. Where automatic playback of an audio message is wholly or partially dependent on a mechanical switch, the packager may install the playback device into the package such that the switch activates when the package is opened. For example, the playback device may be attached to a drawstring of a package, such that loosening the drawstring activates a switch of the playback device. As a further example, a playback device may be attached to one or more structural members of a package (e.g., a lid or sidewall) to ensure that moving the lid or sidewall activates a switch or sensor of the playback device. In some instances, the fulfillment processing system 106 may cause playback devices to be pre-installed into packages for goods. For example, a playback device may be inserted into a package during manufacturing of that package, such that installation of the playback device at the fulfillment center would be unnecessary. In these instances, the fulfillment processing system 106 would simply cause a packager to place the items associated with an order into a package already containing a playback device.

The routine 500 can then continue at block 506, where a playback device identifier is associated with the order. As will be described below, the playback device identifier may subsequently be used by the fulfillment processing system 106 to transmit audio data corresponding to a recorded audio message to the playback device. The playback device identifier may be any information that identifies an individual playback device from among many playback devices. For example, a playback device identifier may be a serial number physically shown on the playback device (e.g., in the form of human-readable symbols or a machine-readable code, such as a barcode), or may be an identification code stored within a memory of the playback device (e.g., a BLUETOOTH address, an NFC universal identifier [UID], an RFID, etc.). Where a playback device identifier is physically shown on the playback device, the playback device identifier may be associated with the order by scanning both the playback device identifier and an order identifier (e.g., as represented via barcodes or other machine readable identifiers), and transmitting both the playback device identifier and the order identifier to the fulfillment processing system 106. Such scanning may occur manually or automatically. Where a playback device identifier is stored within memory of the playback device, the playback device identifier may be associated with the order by electronically communicating with the playback device to receive the playback device identifier, and transmitting that identifier (along with an order identifier) to the fulfillment processing system 106. Illustratively, retrieval of a playback device identifier may occur simultaneously with or shortly after placement of the playback device within a package corresponding to an order.

Thereafter, the routine continues at block 508, where the fulfillment processing system 106 detects the previously identified playback device identifier in conjunction with the package corresponding to the order. Illustratively, implementation of block 508 may occur after completing the package for the order, and placing the package onto a conveyance system. Accordingly, the fulfillment processing system 106 may include one or more scanners, such as barcode scanners, RFID sensors, or other sensors, on the conveyance system that scan each package to determine an order identifier of the package. If the order identifier has been previously associated with a playback device identifier, the fulfillment processing system 106 can, at block 510, initiate communication with the playback device identified by the playback device identifier. In one embodiment, communication between the playback device and the fulfillment system may occur wirelessly via the BLUETOOTH wireless communication protocol. Accordingly, the fulfillment processing system 106 may initiate a "pairing" with the playback device, as identified by the playback device identifier, and transmit audio data corresponding to the order to the playback device.

After transmitting audio data to the playback device, the routine continues at block 512, where the fulfillment processing system 106 causes the package including the playback device to be transmitted to a receiving user. Illustratively, the fulfillment processing system 106 may pass the package to a delivery system, such as a courier service, with instructions to deliver the package to the receiving user. The routine may then end at block 514.

On receiving and opening the package, the playback device can detect that the package has been opened, and begin playback of the audio data. Thus, the routine 500 represents illustrative interactions for receiving a customized audio message from a user computing device in connection with an order for physical items, encoding that audio message into a playback device to be packaged with the physical items, and causing the audio message to be automatically played back to a receiving user on opening the package.

One skilled in the art will appreciate that the routine 500 may include fewer or more interactions than described above, or may be arranged in a different ordering than described with respect to FIG. 5. For example, some embodiments of the present application may include programming a playback device with audio data prior to placing that playback device into a package of ordered items. In such embodiments, the various interactions of the routine 500 may be rearranged, for example, such that transmission of audio data to the playback device (in block 410) occurs prior to placement of the playback device into the package 504. Accordingly, the interactions of routine 500 are intended to be illustrative in nature, rather than exhaustive.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for fulfillment order processing comprising:
a data store including audio data corresponding to a recorded audio message; and
one or more processors in communication with the data store and configured with specific computer-executable instructions that, when executed, cause the one or more processors to at least:
receive the audio data from a computing device of a first user;
associate the audio data with an order for a physical item;
prepare the physical item for shipping by including the physical item within a package;
cause scanning of a machine readable code of the package;
determine an association between the machine readable code and the order;
determine a location of the package based at least in part on the scanning of the machine readable code;
identify, from the location of the package, that the package is within a threshold distance from a wireless transceiver;
in response to identifying that the package is within the threshold distance, initiate, via the wireless transceiver, wireless communication with a playback device placed within the package containing the physical item, the playback device comprising a sensor configured to detect an opening of the package and a microcontroller programmed to playback the audio data in response to detecting the opening of the package;
transmit, through the wireless communication, the audio data to the playback device for storage within memory of the playback device; and
generate instructions to ship the package, including the playback device and the one or more physical items, in accordance with the order.

2. The system of claim 1, wherein the sensor includes a light sensor configured to cause the microcontroller to playback the audio data on exposure to a threshold amount of light.

3. The system of claim 1, wherein the wireless transceiver utilizes at least one of a short range wireless protocol, a near field communication (NFC) protocol, a wireless USB protocol, or an 802.11x protocol.

4. The system of claim 1, wherein the playback device includes a mechanical switch configured for attachment to a portion of the package, and wherein activation of the mechanical switch indicates the opening of the package.

5. The system of claim 1, wherein the computer-executable instructions further cause the one or more processors to at least generate computer-executable instructions that, when executed by the computing device of the first user, cause the computing device of the first user to record the audio data and transmit the audio data to the one or more processors.

6. The system of claim 1, wherein the audio data represents a message recorded by the first user to be played back in response to the opening of the package.

7. A computer-implemented method comprising:
as implemented by one or more processors configured with specific computer-executable instructions:
receiving audio data from a computing device in connection with an order for a physical item;
associating the audio data with a package for a physical item;
receiving, via a scanner, input data associated with a machine readable code of the package;
determining an association between the machine readable code and the order;
determining a location of the package based at least in part on receiving the input data;
identifying, from the location of the package, that the package is within a threshold distance from a wireless transceiver;
in response to identifying that the package is within the threshold distance, initiating, via the wireless transceiver, wireless communication with an output device placed within the package, the output device comprising a microcontroller programmed to playback the audio data in response to detecting an opening of the package; and
transmitting, through the wireless communication, the audio data to the output device for storage within memory of the output device and for output to a receiving party associated with the order.

8. The computer-implemented method of claim 7, further comprising:
generating instructions to place the output device within the package.

9. The computer-implemented method of claim 8, wherein the instructions to place the output device within the package include instructions to an automated storage and retrieval system to retrieve the output device for inclusion within the package.

10. The computer-implemented method of claim 7, further comprising:
receiving an identifier from the output device; and
verifying that transmission of the audio data is to a correct output device based at least in part on the identifier.

11. The computer-implemented method of claim 7 further comprising generating instructions executable by the computing device to display a user interface associated with the order, wherein the user interface includes at least one selectable element to initiate recording of an audio message, and wherein the instructions further cause the computing device to: initiate recording of the audio message in response to selection of the selectable element; and generate the audio data from the audio message.

12. The computer-implemented method of claim 7, wherein the output device further comprises a sensor configured to detect an opening of the package.

13. The computer-implemented method of claim 12, wherein the sensor includes at least one of a mechanical switch or a light sensor.

14. Non-transitory computer-readable media including computer-executable instructions that, when executed by a computer system, cause the computer system to at least:
   obtain media data in connection with an order for a physical item, wherein the media data comprises a message to be output to a receiving party associated with the order;
   modify the order to include an output device, the output device comprising a microcontroller programmed to receive and output the media data, wherein the output device includes a sensor configured to detect an opening of a package in which the output device is placed and, in response to said opening, to initiate output of the media data;
   receive, via a scanner, input data associated with a machine readable code of the package;
   associate the machine readable code with the order;
   determine a location of the package based at least in part on receiving the input data;
   identify, from the location of the package, that the package is within a threshold distance from a wireless transceiver;
   in response to identifying that the package is within the threshold distance, initiate, via the wireless transceiver, wireless communication with the output device;
   transmit, through the wireless communication, the media data to the output device for output to a receiving party associated with the order.

15. The non-transitory computer-readable media claim 14, wherein the computer-executable instructions further cause the computer system to at least instruct an automated storage and retrieval system to include the output device within the package.

16. The non-transitory computer-readable media claim 14, wherein the sensor configured to detect the opening of the package is a switch attached to a movable portion of the package.

17. The non-transitory computer-readable media claim 14, wherein the sensor includes a light sensor configured to initiate output of the media data on exposure to a threshold amount of light.

18. The non-transitory computer-readable media claim 14, wherein the computer-executable instructions further cause the computer system to at least transmit, to a computing device associated with placement of the order, instructions for generation of a user interface configured to enable recording of the audio data and transmission of the audio data to the computer system.

19. A device comprising: a speaker; an electronic communication interface to receive audio data representing an audio message; a physical memory including the audio data that is received via the electronic communication interface; a sensor connected to a package and placed to detect an opening of the package, the package comprising a machine readable code capable of being scanned to determine a location of the package that is within a threshold distance of a wireless transceiver; and a processor configured with specific computer-executable instructions that, when executed, cause the processor to at least: receive, from a wireless transceiver a request to initiate wireless communication with a first computing device; receive the audio data via the wireless communication, wherein the audio data is associated with an order for an item in the package; detect the opening of the package at least partly by detecting an activation of the sensor; and output the audio message represented by the audio data through the speaker.

20. The device of claim 19, wherein the computer-executable instructions further cause the processor to at least determine that at least a threshold period of time has passed between reception of the audio data and the opening of the package.

21. The device of claim 19, wherein at least the physical memory and the processor are included within a microcontroller.

22. The device of claim 19, wherein the sensor is connected to a movable portion of the package, and wherein the sensor is configured to detect an opening of the package at least partly by detecting motion in the movable portion of the package.

23. The device of claim 19, wherein the device is integrated into the package.

24. The device of claim 19, wherein the sensor includes a light sensor configured to cause the processor to output the audio message on exposure to a threshold amount of light.

* * * * *